May 11, 1926.

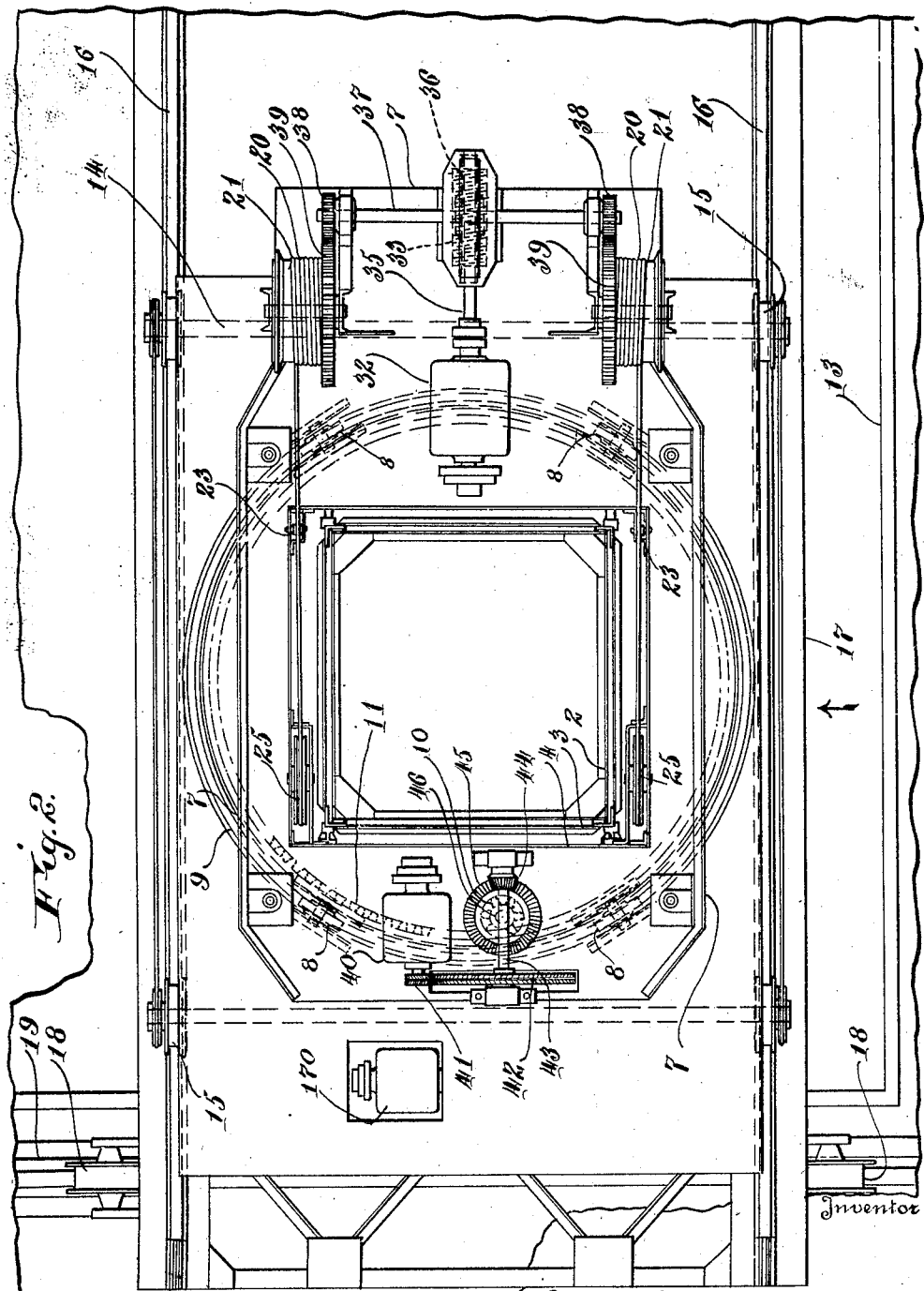

G. O. B. EVERY 1,584,442

CARGO TRIMMER

Filed Sept. 30, 1925   12 Sheets-Sheet 3

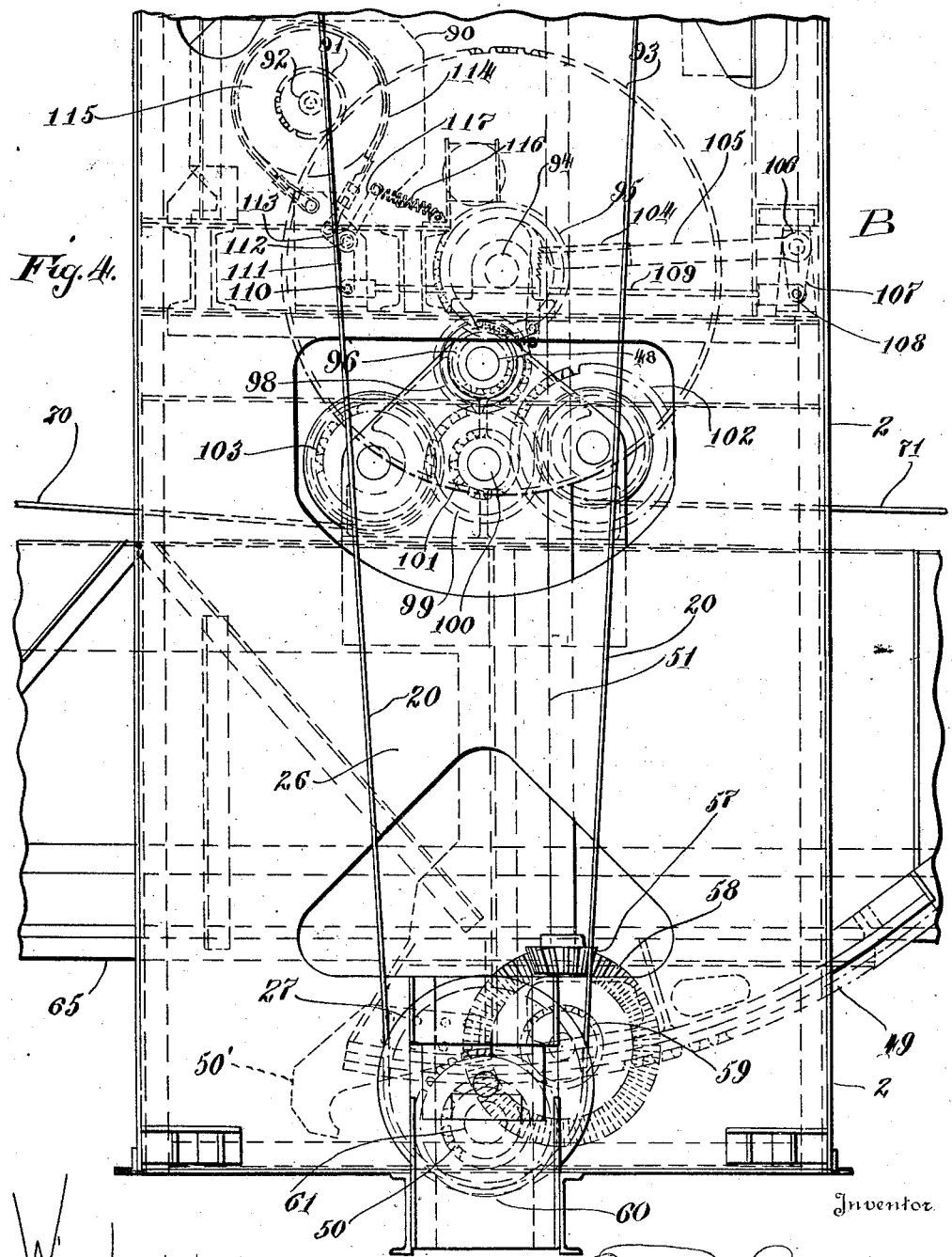

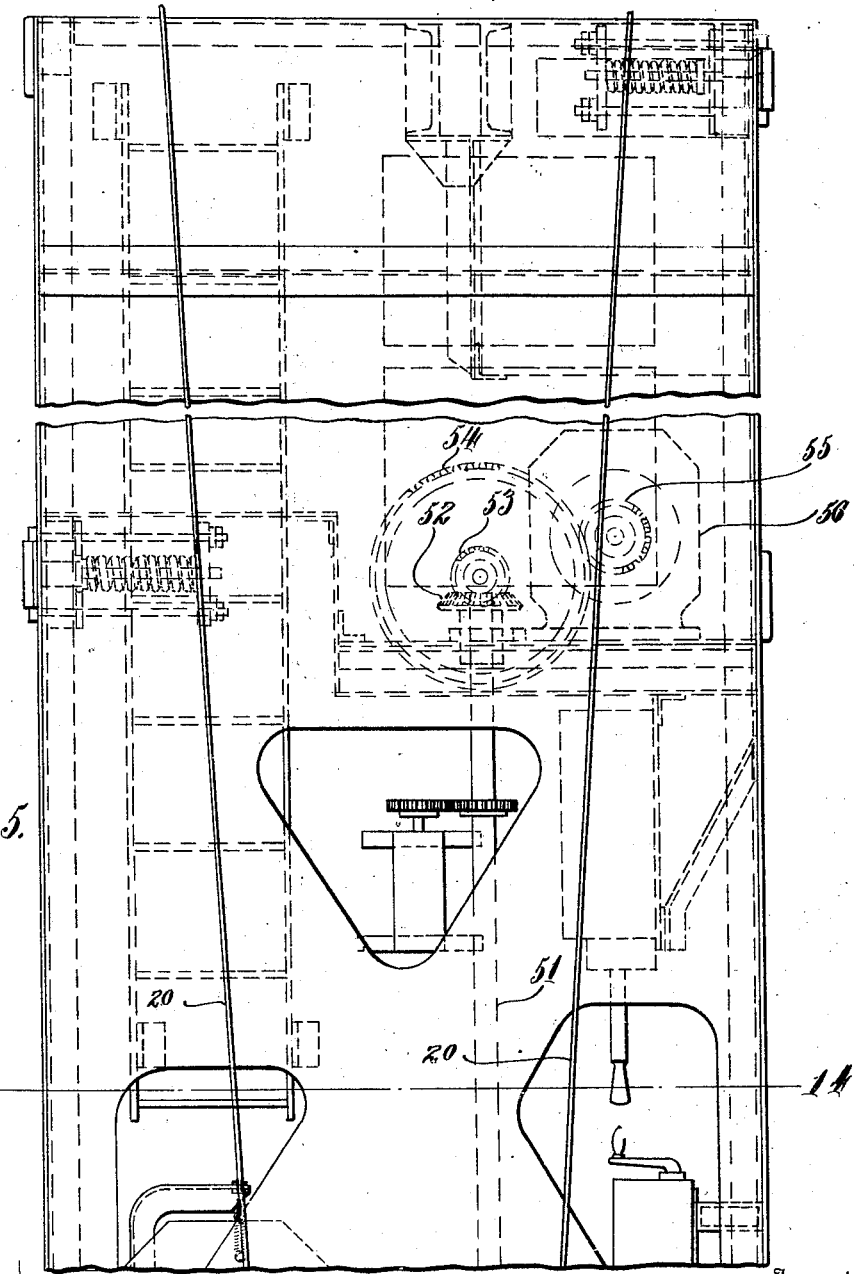

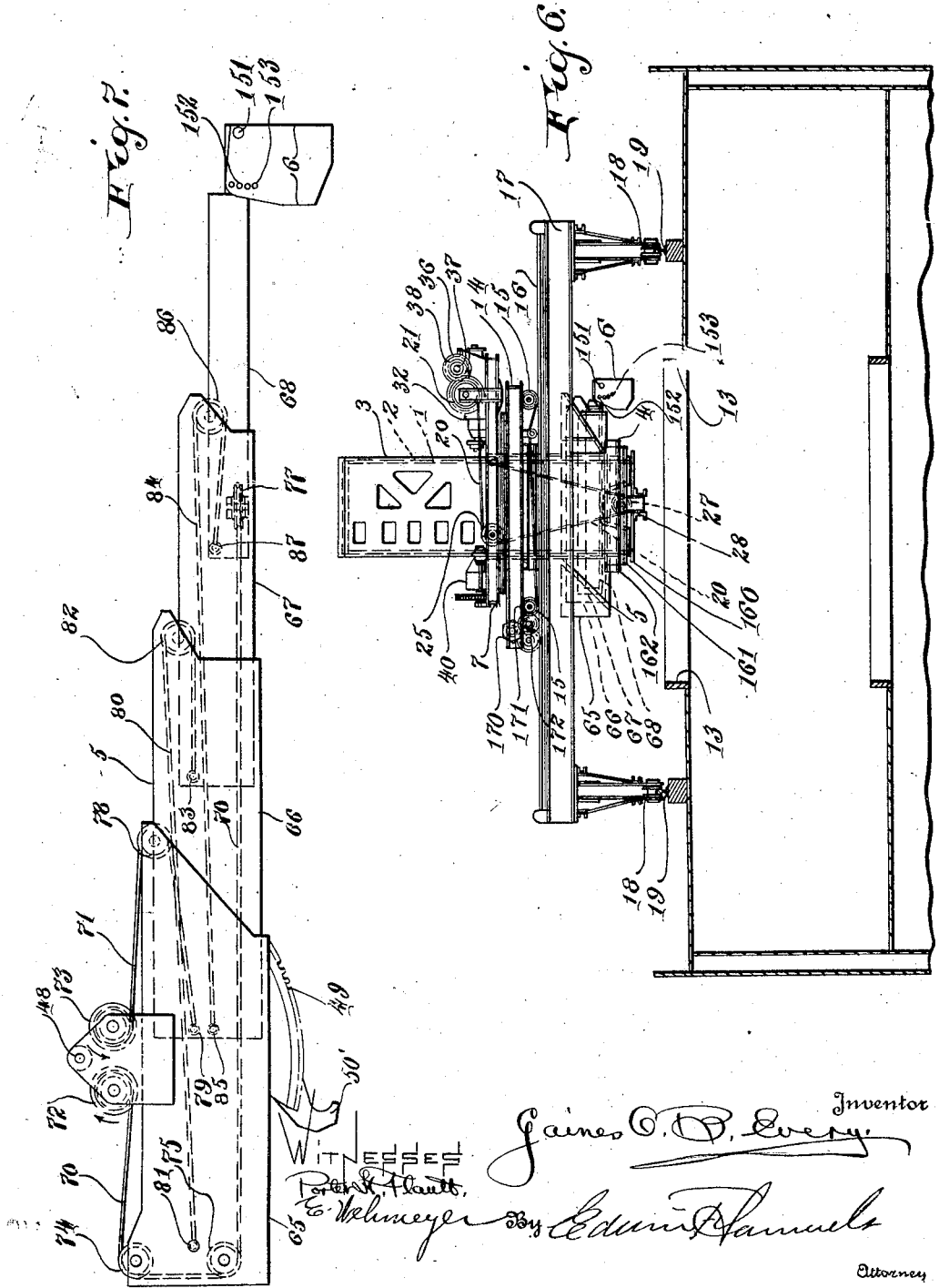

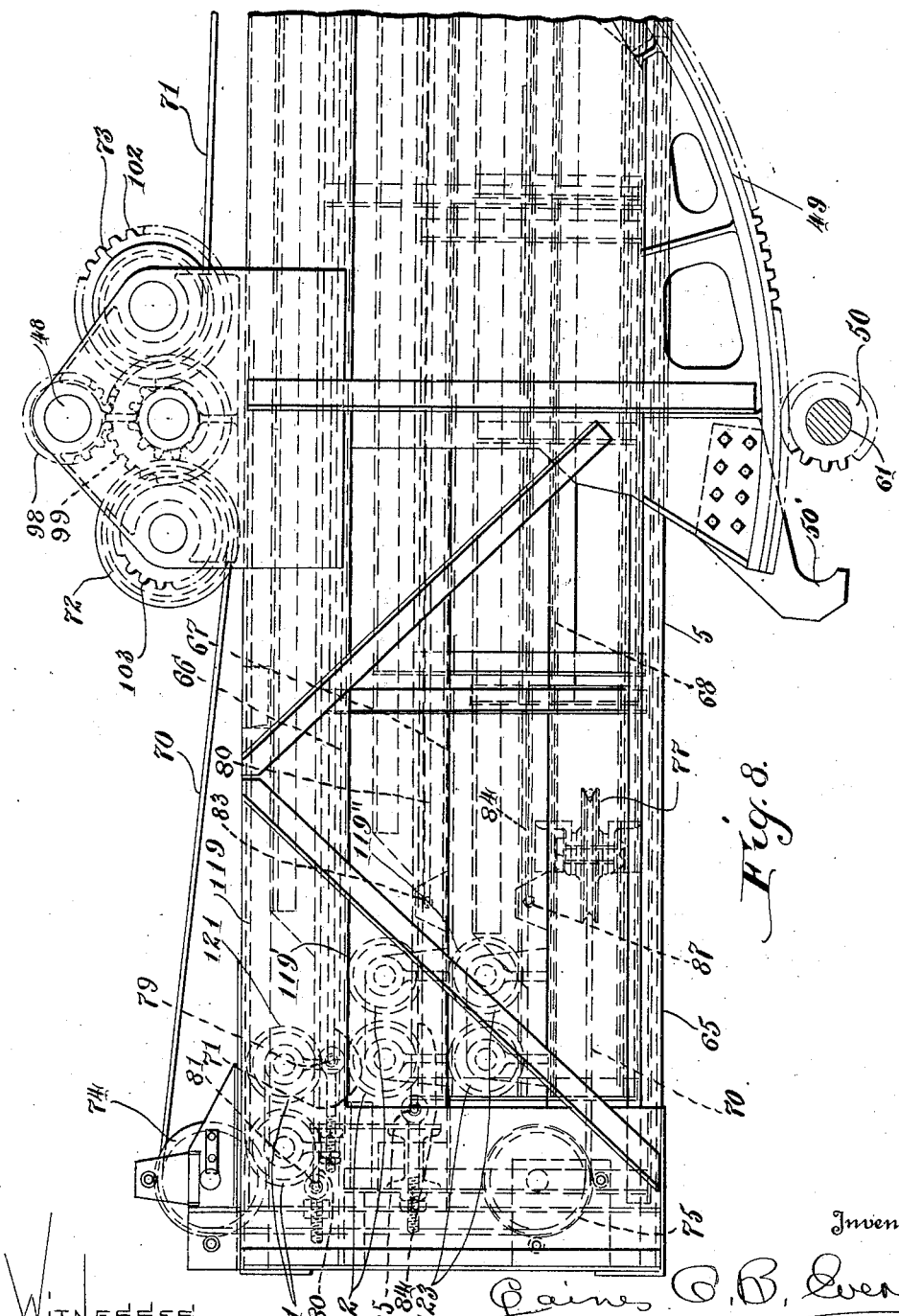

May 11, 1926.
G. O. B. EVERY
CARGO TRIMMER
Filed Sept. 30, 1925   12 Sheets-Sheet 8
1,584,442
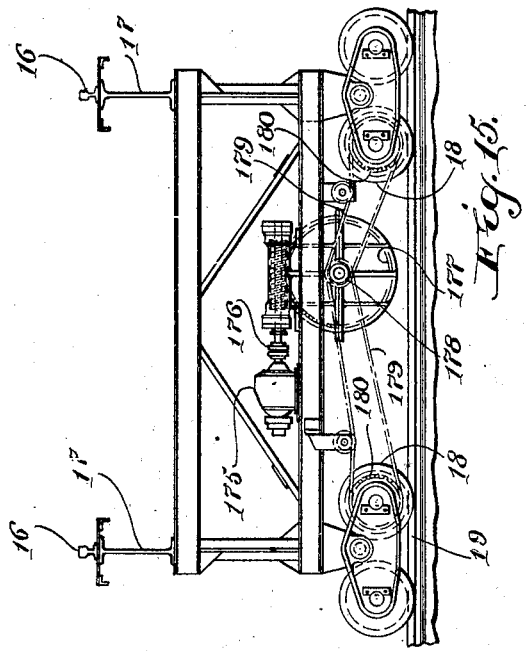
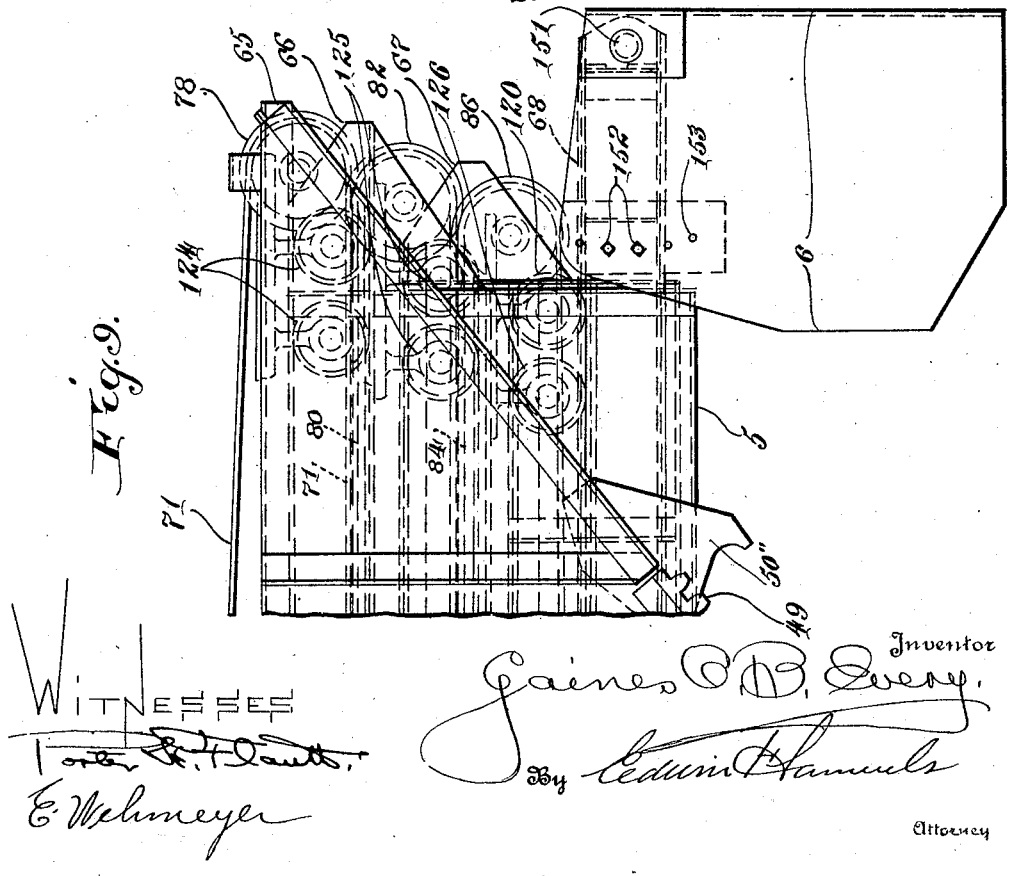

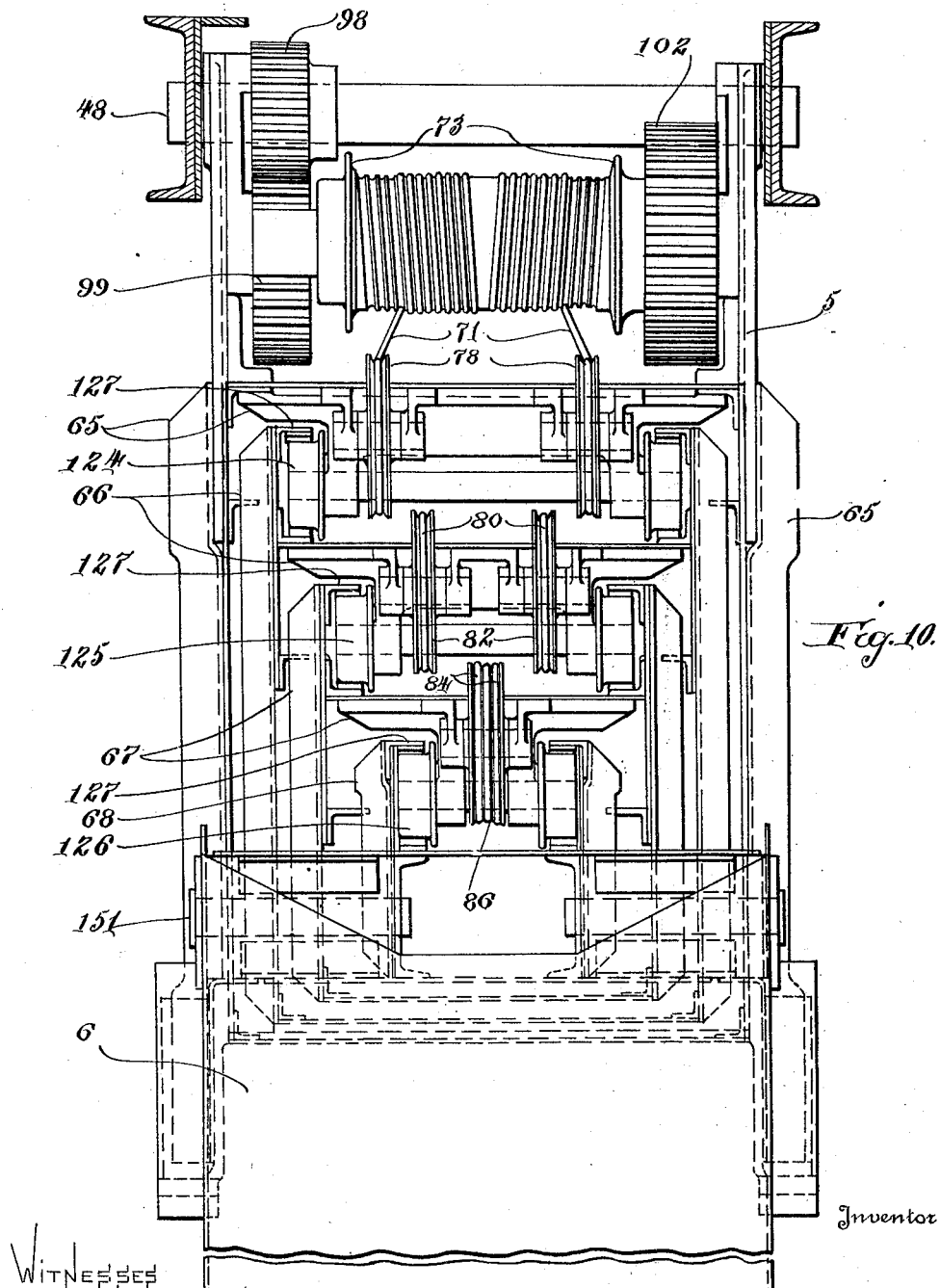

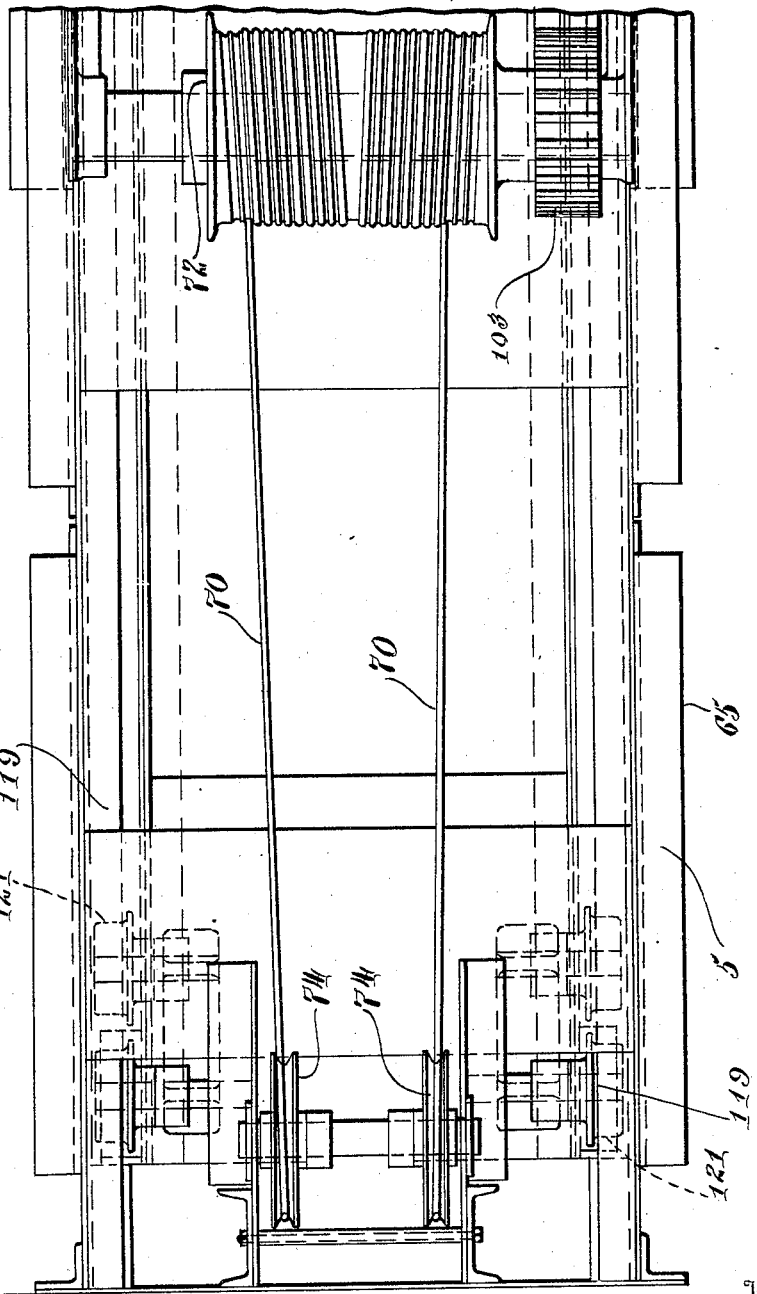

May 11, 1926. 1,584,442
G. O. B. EVERY
CARGO TRIMMER
Filed Sept. 30, 1925 12 Sheets-Sheet 11
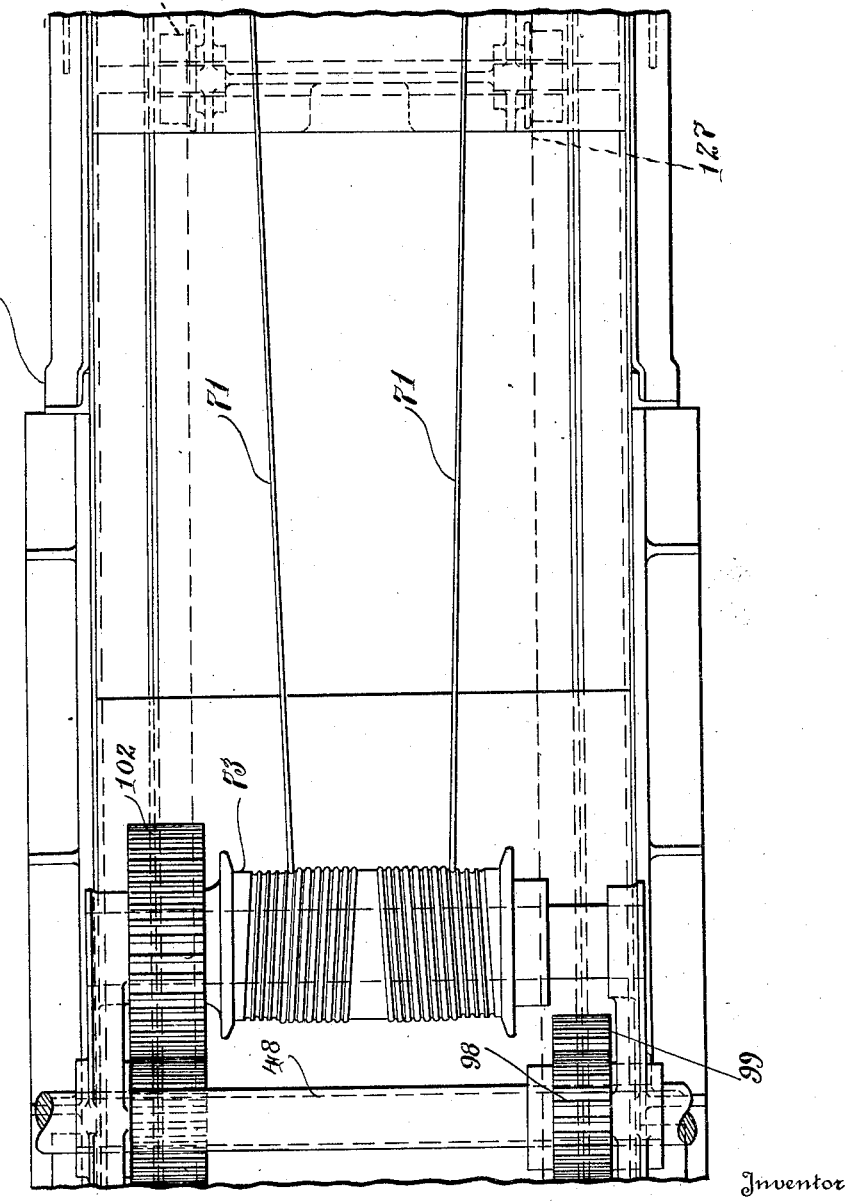

May 11, 1926.

G. O. B. EVERY

CARGO TRIMMER

Filed Sept. 30, 1925 12 Sheets-Sheet 12

1,584,442

Inventor
Gaines G. B. Every
By

Witnesses
Attorney

Patented May 11, 1926.

1,584,442

UNITED STATES PATENT OFFICE.

GAINES O. B. EVERY, OF BALTIMORE, MARYLAND.

CARGO TRIMMER.

Application filed September 30, 1925. Serial No. 59,581.

The present application is in part a continuation of my copending application Serial No. 637,028 filed May 5, 1923.

The loading and unloading of vessels, particularly those carrying cargoes which are handled in bulk without separate containers as coal, sand, gravel, ore, sulphur, lime and the like, involves an expense which is often extremely large in proportion to the original cost of the commodities on account of the necessity for employing expensive hand labor in moving the cargo, particularly in the between-deck areas and hold, from the sides and ends of the vessel to a position beneath the hatchways, in which position it is picked up by power-operated unloading apparatus of any of the various well-known types. Such apparatus can be used without much hand labor to remove the portion of the cargo immediately beneath and adjacent the hatchway. The portion of the cargo not accessible in this way is placed under the hatchway in accordance with the present practice, by stevedores using shovels, or shovels and wheel-barrows for this purpose. This operation is known as trimming, and though there is a great amount of trimming to be done in unloading, trimming to some extent is necessary in loading. For this purpose laborers or stevedores in large numbers are employed and the labor is exceedingly arduous and expensive, and from the standpoint of efficiency, the old method can only be regarded as wasteful.

The object of the present invention is to provide power-actuated means for performing the trimming operation so that the work of trimming the cargo at any one hatchway can be performed by one man.

The apparatus consists of a member, which in operation is a depending member capable of being extended downward through the hatchway to a point near the bottom of the hold and being contracted so that it can be conveniently moved along the deck and from one vessel to the other. The extensible member is preferably mounted on a turntable and carries at its lower end an arm which carries at its outer end a cargo handling tool. The arm can not only be extended to reach all points of the hold from beneath the adjacent hatchway, but can be contracted so as to pass with the upright or depending extensible member through the hatchways and be moved with the apparatus along the deck from one hatchway to the other, and from ship to ship. The apparatus also includes power-actuated means for raising and lowering the depending member and rotating it about its axis, and power for contracting and expanding the extensible arm carrying the cargo handling tool, whereby the latter may be used in both pushing and pulling the cargo to and from all parts of the hold, leveling and distributing it as desired, and may be so contracted as to be conveniently raised and lowered through the hatchways.

The apparatus also includes power-actuated means for swinging the arm in a vertical plane or any vertical radial plane through or substantially through the axes of the depending member.

Other apparatus of this general nature has been disclosed in various patents, but they differ from this apparatus in that they are less conveniently operable and for this reason such previously conceived apparatus has never come into general use. Certain prior apparatus actuated by toothed gearing has been placed in operation to a slight extent, but it has never been commercially successful as the toothed gearing presents almost insurmountable difficulties in the handling of the extensible arm and as compared to this the cable operation of the arm as herein disclosed, possesses great advantage in the way of direct application of the power and the elimination of friction, and incidental to the latter in the complete absence of sparking which is very important on account of the inflammability of the dust of many of the cargoes handled, which dust is often explosive, and easily ignited by such sparking.

In the accompanying drawings I have illustrated a cargo trimming apparatus embodying the features of my invention in the preferred form.

In the drawings:

Figure 2 is a top plan of the apparatus partly broken away for convenience of illustration.

Figure 3 is a side elevation of the turntable looking in the direction of the arrow in Figure 2.

Figure 4 is a fragmentary elevation of the lower portion of the lower section of the depending extensible member as shown extended in Figure 1, looking from the same viewpoint.

Figure 5 is a similar view showing the top portion of the bottom section of the depending member.

Figure 6 is a view corresponding to Figure 1 showing the extensible arm contracted and the depending extensible member likewise contracted and withdrawn to its upper position, the extensible member having been withdrawn through the hatch and being in position to be moved from one hatchway into the other and from ship to ship.

Figure 7 is an elevation on a small scale of the extensible arm carrying the cargo handling tool, the arm being extended.

Figure 8 is a side elevation of the arm carrying the cargo handling tool, the sections of the arm being retracted and the view being broken away at the right for convenience of illustration.

Figure 9 is a corresponding view of the outer end of the arm likewise broken away at the left. The end shown carries the bucket or tool.

Figure 10 is an elevation of the outer end of the arm looking inward toward the depending member.

Figures 11, 12 and 13 are top plan views showing the inner end of the extensible arm, the central portion of the extensible arm, and the outer or swinging end portion of the extensible arm, respectively, in the order named, the views being broken away at the ends and being continuous one with the other, and the arm being removed.

Figure 15 is a fragmentary elevation showing the bottom truck drive.

Figure 1:
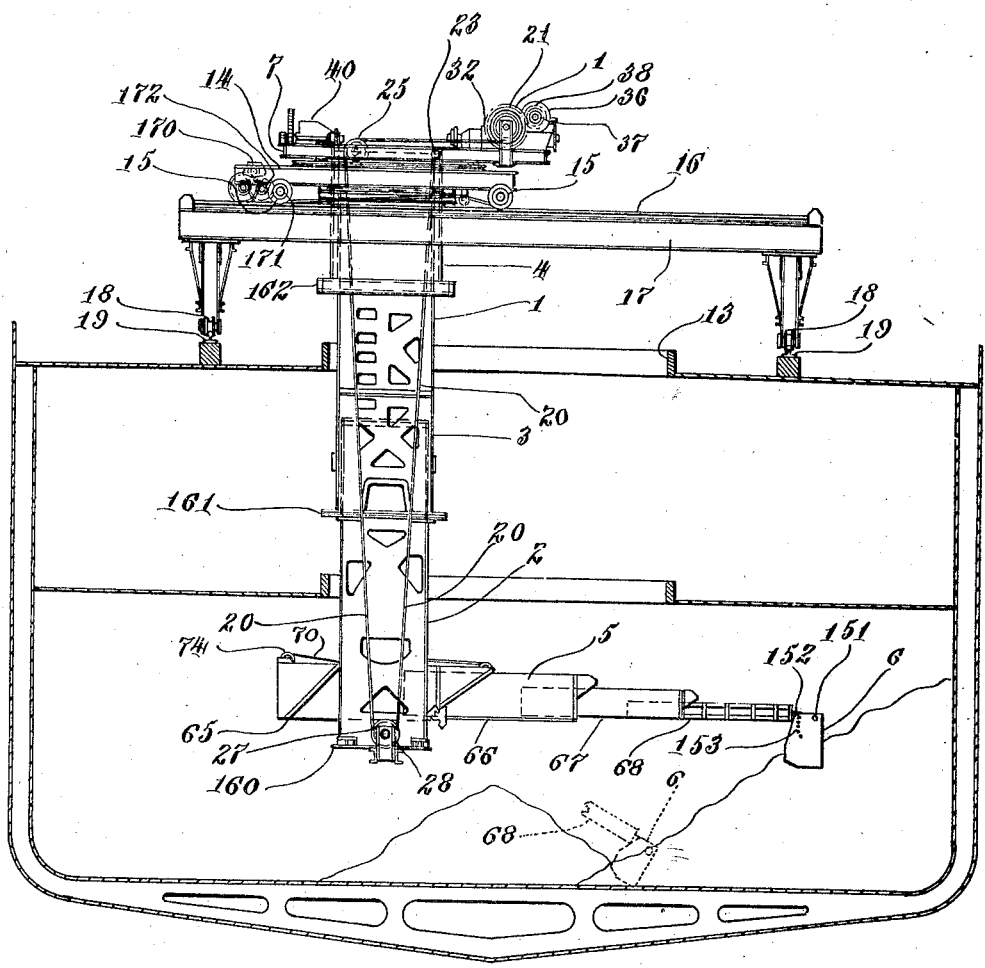
Figure 1 is a transverse section through a vessel showing the cargo trimmer extended into the hold through the hatchway in operative position.
Figure 14:
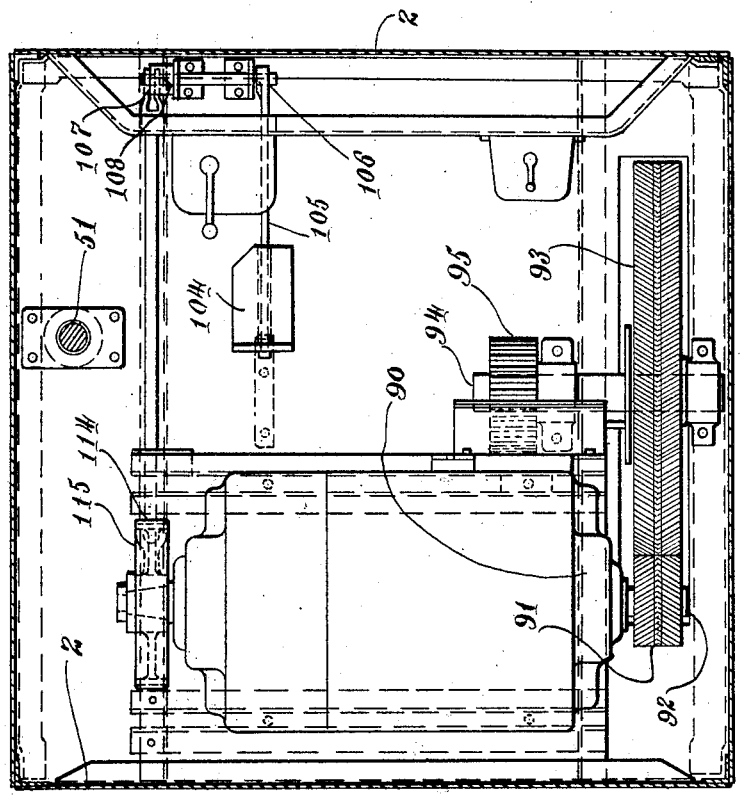
Figure 14 is a horizontal section on the line 14—14 of Figure 5, looking down.
Figure 13:
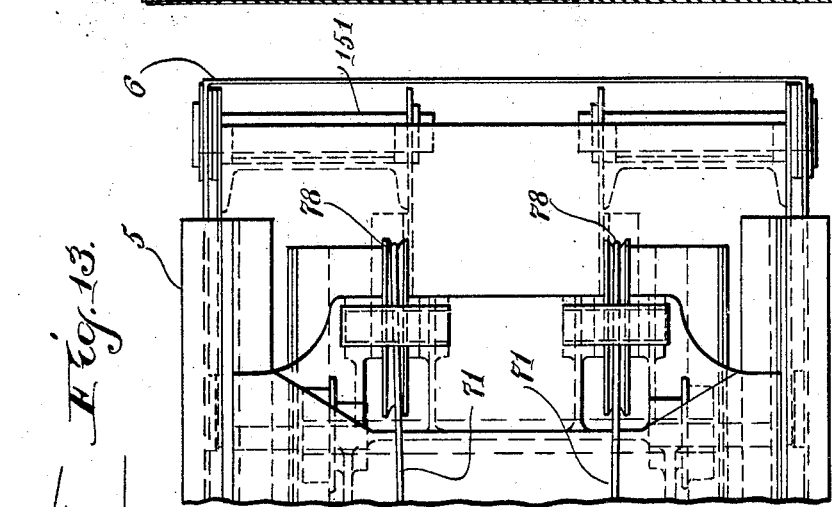

Referring to the drawings by numerals, each of which is used to indicate the same or similar parts in the different figures and at present having particular reference to Figures 1, 2 and 6, the apparatus as shown comprises a depending extensible member 1 shown in the form of a series of telescoping sections 2, 3, 4. The depending extensible member 1 carries a transverse extensible arm 5 provided at its outer end with a cargo-handling tool or bucket 6. The depending member is mounted on and has its upper section 4 secured to turn-table 7, which, as shown, is supported on rollers 8 engaging a circular track 9, Figure 2, and the turn-table is actuated by a pinion 10 which engages the toothed ring 11. The latter and the track 9, as shown, are mounted on a truck 14 having wheels 15 which engage a track 16, which, as shown in Figure 2, is placed transversely of the deck and hatch, this track 16 in the form of the invention shown is mounted on a lower truck or carriage 17 which spans the hatchway 13 and is supported on wheels 18, which engage a track 19 which may extend longitudinally of the deck at each side of the hatch.

The extensible member is controlled for extension and contraction by means of cables 20—20 on drums 21—21 at each side, each cable being secured at one end to the drum and at the other end to a point 23 on the upper section 4, Figures 1 and 12, the intermediate portion of each cable being passed over the corresponding sheave 25 at the top and extending downward to the bottom of the lower section 2 of the extensible member where each cable is passed about the corresponding pulley 27, mounted in suitable bearings 28 in the lower end of the lower section 2 and upward to the point 23 before mentioned, where it is secured to the top section 4 which is rigidly secured with a turn-table. The drums 21 are actuated by a motor 32 mounted on the frame and having a worm 33 on the motor shaft 35 which engages a worm gear 36 on the shaft 37 carrying at each end a pinion 38, each of which pinions engages a corresponding toothed gear 39 secured to the corresponding drum 22. The parts move downward by gravity, and are supported in the desired position by the cables.

The turn-table 7 carrying the upper section 4 of the depending extensible member is rotated by pinion 10 from an electric motor 40 carried on the turn-table and connected to the pinion 10 by and through a train of gearing consisting of a pinion 41 on the motor shaft, a toothed gear 42 engaged by the pinion, shaft 43 carried by the gear 42, bevelled pinion 44 on the shaft, bevelled gear 45 engaged by the pinion, and shaft 46 carried by the gear 45 and carrying the pinion 10, which in turn engages the ring gear 11 secured to the frame of the upper truck member.

The turn-table as aforesaid, is carried on rollers 8 engaging a suitable support or track 9 on the upper truck 14.

The transverse extensible tool arm 5 is mounted on and in the lower end of the lower section 2 of the depending extensible member 1 on the shaft 48, and is actuated to swing about this shaft as a center by means of a toothed sector 49, which is engaged for this purpose by a toothed pinion 50 which is in turn controlled and driven by and through the vertical shaft 51 which carries at its upper end secured thereto a bevelled pinion 52, which meshes with a bevelled pinion 53 carried by a toothed gear 54 meshing with a toothed pinion 55 on the shaft of an electric motor 56. The shaft 51 carries at its lower end a bevelled pinion 57 which meshes with a bevelled gear 58 carrying a pinion 59 which meshes with a gear 60 on the shaft 61 of the pinion 50. The toothed sector 49 is secured to the inner end section 65 of the extensible swinging tool arm 5.

The extensible swinging tool arm 5 just referred to comprises the base section 65 which as aforesaid, is pivoted in the lower section 2 of the depending extensible member 3 and sliding sections 66, 67, 68, see particularly Figure 7. These sections are primarily actuated by double or pairs of cables 70 and 71 mounted on drums 72 and 73. The cable 70 is secured at each end to the drum 72 about which both ends are wrapped, being in fact a continuous cable, and is passed about pulleys 74 and 75 on the base section 65 of the arm and is carried outward toward the end of the arm and looped about a single pulley 77 on the outer sliding section 68. This pulley acts as a cable holder to secure the cable to the section 68 and also equalizes the pull on the cable. The cable 70 closes or contracts the arm when wound upon the drum, drawing in the outer sections and causing all the sections to close like a telescope.

The cable 71 and all of the cables referred to as actuating the sections of the arm are double or in pairs as illustrated in Figures 10, 11 and 12. For convenience in describing the pairs of cables, they are referred to at times as single cables. Cable 71 is secured at one end to the drum 73 and wound about the drum and then passed outwardly toward the end of the stationary base section 65 of the arm about a pulley 78 mounted in the extreme end of the section 65. From this pulley the cable is passed back to the inner end of the first sliding section 66 of the arm 5 where it is secured at 79. When the cables 71 are wound upon drum 73, the section 66 carrying the two sections 67 and 68 is thrust outwardlly. Sections 66, 67, 68 are actuated respectively by the cables 71, 80 and 84. The cable 71 actuating section 66 has just been described. The cable 80 is connected at one end at 81 to the stationary or base section 65 and is passed outwardly about a sheave or pulley 82 on the outer end of the first sliding section 66 and backward from the pulley 82 toward the base section having its other end secured at 83 to the inner end of the second sliding section 67 which it actuates.

The cable 84 is secured at one end at 85 to the first sliding section 66 at its inner end, and is passed around a pulley 86 mounted on or near the end of the second sliding section 67 and is secured at its other end at 87 to the rear or inner end of the outer sliding section 68. It is clear that as sections 66 and 67 move outward, carrying pulleys 82 and 86, they tighten cables 80 and 84, respectively, section 66 moving section 67 and section 67 moving 68 by said cables.

The drums 72 and 73 are actuated, as illustrated in Figure 4, from and by a motor 90, Figure 4 by a train of gearing comprising pinion 91 mounted on motor shaft 92, which pinion 91 has herring-bone teeth and engages a large gear 93 of similar type on a shaft 94, which shaft carries a pinion 95 meshing with a gear 96 loose on shaft 48, to which gear 96 is secured gear 98, which meshes with a gear 99 on the shaft 100. The latter shaft carries a gear 101 which meshes with a gear 102 secured to the drum 73 and the gear 99 meshes with a gear 103 secured to the drum 72.

The extensible arm sections 66, 67, 68, see particularly Figures 8, 9 and 10, 11, 12 and 13, slide relatively to each other on rollers, there being two sets of such rollers for each of the sliding arms, one set guiding and supporting each end of each sliding arm in and near retracted position. The rollers of each set are four in number, two at each side of the arm to which they relate, the rollers at each side being spaced apart in the direction of the length of the arm. The first sliding section 66 is provided with a set of four rollers 121, at its rear end which bear on suitable tracks 119 on the upper inside surface of the base member 65, and each of the other sliding sections 67, 68 is provided with a corresponding set of rollers 122, 123 which correspondingly engage from below the upper inside surfaces or tracks 119' and 119'' of the next sections 66 and 67 toward the base on and in which the particular sections 67 and 68 slide, and each of the sections 65, 66, 67 which carries a section sliding relatively thereto is provided at its outer end with a corresponding set of four rollers 124, 125, 126, which engages upwardly against track surfaces 127 on and support the respective sections 66, 67, 68, which slide relatively thereto, see Figure 10.

In Figure 4 I have also illustrated a braking mechanism in the form of a foot brake for checking the motion of the arm sections at any desired point. This brake consists of a pedal 104 carried by pedal lever 105 in the form of a bell crank pivoted at 106 and having a depending arm 107 to which is connected at its lower end at 108 a connecting rod 109 connected at its other end at 110 to the depending arm of a bell crank lever 111 which is pivoted at 112 and has its other arm 113 connected to the end of a brake band 114 which is passed about a drum 115 on the motor shaft. The brake is normally released by a spring 116 on arm 117.

The operation of the cargo trimmer will be apparent in a general way from the preceding description. The apparatus as a whole with the extensible members contracted and withdrawn, as particularly illustrated in Figure 6, may be moved from one vessel to another and from place to place as desired by means of a travelling crane or by any other available agency.

When engaged in trimming the cargo of a vessel, the trimmer is preferably mounted as shown in Figures 1, 2 and 6. The lower truck 17 moves longitudinally of the vessel on tracks 19 at each side of the hatchway which it spans. This truck 17 preferably extends across the opening of the hatchway 13 as shown in Figure 1. The upper truck 14 moves transversely of the vessel and across the hatch on tracks 16 which are mounted on the lower truck 17 which makes it possible to move the apparatus to all points over the hatchway and where the vessel has several hatchways, the tracks 19 may run the entire length of the hatchway area and by contracting the extensible members of the apparatus, as shown in Figure 6, it may be moved to all points over all of the hatchways of the vessel.

The depending extensible member 1 is rotated in a horizontal plane about its vertical axes by means of motor 40. This, with the train of gears 41—46 connecting it to pinion 10 which engages ring gear 11, is mounted on the turn-table 7. The turn-table carries rigidly secured to it, the top section 4 of the extensible member.

The depending extensible member is extended and retracted by the action of motor 32 through the train of gears connecting its shaft 35 to the large gears 39 on the drums 21 which take up and let off the cables 20 which are looped at the bottom beneath the pulleys 27 mounted on the lower end of the bottom section 2 of the extensible member 1, all of said members including the motor 32, train of gears 35—39, drums 21, etc., also being mounted on the turn-table 7 to rotate therewith.

The sections of the extensible member are moved downward by gravity and supported on the cables 20 so that the length of the depending extensible member is controlled directly by the motor 32 by winding the cables 20 on the drums 21. The upward movement of the sections 2, 3 and 4 is limited by flanges or abutments 160, 161 and 162, projecting outward from the lower edges of the respective section 2, 3 and 4 of the depending extensible member 1.

The tool 6 is pivoted on the end of the arm by shaft 151 and may be adjusted by pin 152 in holes 153. The extensible arm 5 carrying the cargo-handling tool 6 is rocked in a vertical plane by motor 56, rotating the depending shaft 51, and the train of gears connecting it to the pinion 50 which engages the toothed segment 49 secured to the base member 65, member 65 and the arm being pivoted on the lowest section 2 of the dependable member by the journal or shaft 48. Hooks 50' and 50'' at each end of the segment engage the shaft 61, carrying pinion 50, and act as stops to limit the throw of the arm. The arm is extended and retracted by motor 90 actuating the drums 72—73, by and through the train of gears described. The cable 70 which as described is looped around the pulley 77 on the outer end section 68, applies a direct inward tension to the outer section and serves to withdraw or retract the sections, which are slid one within the other by this agency as cable 70 is wound up on drum 72. They are thrust outwardly by cables 71, 80, 84.

To extend the arm, the cable 70 is unwound by and from the drum 72 as the cable 73 is wound up, the direction of the winding upon the drums and the gear connections which are fully apparent from the drawing being arranged accordingly, detailed analysis being regarded as unnecessary. As the drum 72 rotates to unwind the cable 70, the drum 73 winds up the cables 71. Taking up on the cable 71 about the pulley 78 applies an outward pull to the point 79 of the first sliding section 66 to which the ends of cables 71 are attached. The member 66 accordingly moves outward and carries with it the pulley 82 which is mounted on the outer end of this sliding section 66. The cables 80 are looped about the pulleys 82 and secured to points 81 on the base member 65, and their other ends are fastened at 83 at the inner end of second sliding section 67, the outward motion of the pulleys 82, the ends 81 of the cables being stationary, applies an outward tension or pull at the point 83 of the sliding section 67 to which the moving ends of the cable 80 are secured, consequently imparting an outward motion to the sliding section 67. The operation of cables 84 passed over the pulleys 86 on the outer end of the sliding section 67, and fastened at one end to the first sliding section 66 at 85 and at the other end to the rear or inner end of the outer sliding section 68 at 87 is similar to that of the cable 80 just described. This arrangement gives a uniform advancement and retracting of each arm relatively to the next at all times, keeping the arm properly balanced.

The upper truck 14 may be propelled along the rails across the hatch by motor 170 suitably connected to a separate drive wheel 171 by gearing 172 and the bottom truck 17 may be likewise propelled along the hatch and longitudinally of the vessel on rails 19 by motor 175, having worm shaft 176 driving a worm gear 177 which in turn drives through sprockets 178 to chains 179 which drive sprockets 180 on the truck wheels 18, see Figure 15.

The apparatus is thus entirely motor driven and may be moved and operated to trim the cargo at all levels and in all points of the hold by one man.

I have thus described specificallly and in detail a single embodiment of my invention in order that the structure and operation may be clearly understood; however, the specific terms herein are used descriptively rather than in a limiting sense, the scope of the invention being defined in the claims.

What I claim and desire to secure by Letters Patent is:

1. In a cargo trimmer, a truck adapted to span the hatchway of a vessel and move along the deck of the vessel, a second truck mounted on the first-mentioned truck to move transversely thereof, a turntable mounted on the second truck, a depending extensible member mounted on the turntable and a transverse extensible arm with a cargo handling tool at its extremity mounted at the lower end of the extensible member, power-operated means for propelling both trucks, power-operated means for rotating the turn-table, and power-operated means for controlling the length of the dependable member and power-operated means for extending and retracting the extensible transverse arm at the bottom of the extensible member to actuate the tool.

2. In a cargo trimmer, a truck running longitudinally of the vessel, a second truck mounted on the first mentioned truck to move transversely thereof, a turn-table mounted on the second truck, a depending extensible member mounted on the turntable and a transverse extensible arm with a cargo handling tool at its extremity mounted at the lower end of the extensible member, power-operated means for propelling both trucks for rotating the turn-table for controlling the length of the dependable member, and for extending and retracting the extensible transverse arm to actuate the tool, the transverse extensible arm being pivotly mounted to swing in a vertical plane, and means for swinging the arm.

3. In a cargo trimmer, a depending extensible member with power-operated means for controlling the length of the same, and a transverse extensible arm mounted on the lower end of the extensible member, and supported thereon, the extensible arm comprising a base section having a pulley at its outer end, pivotal means connecting the same to the depending member, and a plurality of relatively sliding sections, some having pulleys at their outer ends, one of said sections being mounted to slide on the base member, and the remainder of the sections sliding one on the first mentioned sliding member and each subsequent section being mounted to slide on the next preceding member, means for actuating the same comprising a plurality of drums, means for rotating them simultaneously, a cable wrapped about each drum so that one cable is let off as the other is wound up, one of said cables being connected directly to the outer sliding section and serving to withdraw the same and contract the arm, the other cable being passed around the said pulley and led backward in the direction of the pivot and connected to the inner end of the first sliding section, a cable looped about each of the pulleys at the ends of the sliding sections and having both ends drawn backward in the general direction of the pivot, one end being connected to a portion of the arm not sliding with said section, and the other end being connected to the rear or inner end of the next outer sliding section so that each sliding section except the one on the base section is actuated in the outward thrust by the next sliding section to the rear, i. e., in the direction of the base.

4. In a cargo trimmer, a depending extensible member with power-operated means for controlling the length of the same, and a transverse extensible arm mounted at the lower end of the extensible member, and supported thereon, the extensible arm comprising a base section and pivotal means connecting same to the depending member, and a plurality of relatively sliding sections, one of said sections being mounted to slide on the base member, and each subsequent sliding member being mounted to slide on the next preceding member, means for actuating the same comprising rotating drums, a cable wrapped about each drum, so that one cable is let off as the other is wound up, one of said cables being connected directly to the outer sliding sections and serving to withdraw the same and contract the arm, the other cable being passed around a pulley, said pulley being mounted near the outer end of the base section, the cable being led backward in the direction of the pivot and fastened to the rear end of the first sliding section, the first sliding section and each successive sliding section except the outer end section carrying near its outer end a pulley and a cable looped about the pulley and having both ends led backward in the general direction of the pivot, one end being connected to a portion of the arm in the rear of said section and the other end being connected to the rear or inner end of the next outer sliding section, so that each sliding section except the first is actuated in extending the arm by the next sliding section to the rear, rollers mounted near the rear end of each sliding section bearing upwardly against the section in which it slides and rollers mounted near the outer end of each section except the outer end section supporting the section which slides thereon.

5. A cargo trimmer comprising a support, a depending extensible member with power-actuated means for controlling the length of the depending member, a transverse arm mounted to swing relatively to the lower end of the depending member, the transverse arm being composed of a plurality of sections comprising a base section and a plurality of sections sliding relatively to each other and to the base section, a cargo handling tool mounted on the outer sliding section, means for actuating the sliding sections comprising a cable connected to the outer section and to the base section, means on the base section for taking up the cable to contract the arm by withdrawing the sections within the depending member, means for extending the arm comprising a cable and a pulley on the outer end of the base section, the cable being connected to the first sliding section near its rear and with means for taking up the cable to draw the rear end of said sliding section toward the said pulley on the outer end of the base section, a pulley mounted on and near the outer end of each of the sliding sections except the outer section, and a cable for each said section passed about said pulley and connected at one end to the rear end of the sliding section next beyond the section carrying the pulley, and at the other end to a portion of the apparatus relatively to which the section carrying the pulley is moved in extending the arm so that the motion of each sliding section actuates the next sliding section in extending the arm.

6. A cargo trimmer comprising a depending extensible member to be extended through the hatchway into the hold and a transverse arm at the lower end of the extensible member, the same comprising a base section pivotally mounted on the lower end of the extensible member and a plurality of sliding sections, one sliding on said base member and the others each sliding on and relatively to the next section in the direction of the base member, means for actuating said sections to extend and contract the arm, and means for supporting the sliding sections comprising rollers mounted on the rear end of each section, and a track above each roller, the said track being mounted in the section which supports the said sliding section, and rollers at the outer end of each section except the end section, the section which slides relatively to the section carrying each said roller engaging the roller from above.

7. A cargo trimming apparatus, the combination of a turn-table, an extensible depending device secured to the turn-table, means for supporting the turn-table over a hatchway of a vessel, power-actuated means for controlling the depending extensible member as to its length, an extensible tool arm at the lower end of the depending member, said arm comprising a base and a plurality of sections mounted to slide relatively thereto and relatively to each other, and power-actuated means for sliding said sections extending and shortening the arm.

8. A cargo triming apparatus comprising a depending extensible member, means for supporting the same over the hatchway of a vessel, so the depending member can be extended down through the hatchway into the hold, power-actuated means for controlling said member as to its length, a transverse extensible arm mounted at the lower end of said extensible member, said arm comprising a base and a plurality of sections mounted to slide relatively thereto and relatively to each other, a cargo engaging tool carried by said arm, and power-actuated means for sliding said sections advancing and retracting said tool in substantially horizontal directions.

9. A cargo trimming apparatus comprising a turntable, a depending extensible member carried by the turntable, means for supporting the turntable over the hatchway of a vessel, so the depending member can be extended down through the hatchway into the hold, a motor on the turntable for controlling said member as to its length, a transverse extensible arm mounted at the lower end of said extensible member, a cargo engaging tool carried by said arm, and a motor for advancing and retracting said tool in substantially horizontal directions.

10. A cargo trimming apparatus comprising a depending extensible member carried by the deck structure of the vessel, means for supporting the same over the hatchway of a vessel, so the depending member can be extended down through the hatchway into the hold, power-actuated means for controlling said member as to its length, a transverse extensible arm mounted at the lower end of said extensible member, a cargo engaging tool carried by said arm, and power-actuated means for advancing and retracting said tool in substantially horizontal directions, said supporting means extending longitudinally and laterally of the vessel.

11. A cargo-trimming apparatus comprising a depending extensible member, means for supporting the same over the hatchway of a vessel, so the depending member can be extended down through the hatchway into the hold, power-actuated means for controlling such member, a transverse extensible arm mounted at the lower end of said extensible member, a plurality of sliding sections composing said arm, a cargo engaging tool carried by said arm, and power-actuated means for extending and shortening said arm, the sections composing said arm being proportioned so that they can be withdrawn substantially within the depending member.

12. A cargo-trimming apparatus comprising a depending extensible member, means for supporting the same over the hatchway of a vessel so the depending member can be extended down through the hatchway into the hold, power-actuated means for controlling said member, a transverse extensible arm mounted at the lower end of said extensible member, a cargo engaging tool on said arm, power-actuated means for advancing and retracting said tool, said arm being so proportioned that it can be withdrawn substantially within the depending member, and power-actuated means for swinging said arm up and down likewise moving the tool up and down.

13. A cargo trimming device consisting of an extensible depending member, means for supporting said extensible depending member over the hatchway of a vessel, so that it may be extended downward through the hatchway into the hold, means for controlling the same as to its length, a transverse extensible arm mounted at the lower end of said extensible member, said arm comprising a base mounted on the dependable member and a plurality of sections mounted to slide relatively to each other and to the base, and a cargo handling tool on said arm, means for extending and shortening the arm, the arm being so proportioned that when shortened it may be passed through the hatchway, as the depending member is lowered and raised.

14. A cargo trimming device consisting of an extensible depending member, means for supporting said extensible depending member over the hatchway of a vessel so that it may be extended downward through the hatchway into the hold, a motor mounted in said depending member controlling the operation thereof, a transverse extensible arm, mounted at the lower end of said extensible member, said arm comprising a base and a plurality of sections sliding relatively to each other and to said base, and a cargo handling tool at the end of said arm, means carried by the depending member for extending and contracting the arm so it may be passed through the hatchway as the depending member is extended or lowered and raised, and power-actuated means for contracting said extensible, depending member, controlling the position of said arm and tool.

15. In combination with hull of vessel having a deck and a hatchway, a cargo trimming device consisting of an extensible depending member, means for supporting said extensible depending member over the hatchway so that it may be extended downward through the hatchway into the hold, a transverse extensible arm, mounted at the lower end of said extensible member and a cargo handling tool at the end of said arm, means for extending and contracting said arm, so it may be passed through the hatchway as the depending member is extended and raised, and power-actuated means for contracting said depending extensible member, raising and controlling the position of said arm and tool, and means for swinging said arm vertically.

16. The combination in a cargo handling apparatus of a turn-table, means for supporting the same over the hatchway of a vessel and means for rotating the turn-table, an extensible member composed of relatively sliding sections, one of said sections being secured to the turn-table, a flexible tension member connected to the top and bottom sections, means for winding up and releasing the tension member to control the relative positions of the sections, a transverse extensible arm also composed of a base and a plurality of sliding sections, said base being mounted in the lower section of the first mentioned extensible member, a cargo handling tool at the end of said transverse arm, and power-actuated means for extending and shortening said arm, advancing and withdrawing said tool, the parts being so proportioned that the transverse arm may be so far withdrawn as to permit it to be raised and lowered through the hatchway in the regular operation of the device, without in any way dissembling the apparatus.

17. In a cargo trimming apparatus, a turn-table, a truck supporting the same so that it can be moved longitudinally of the vessel, means for raising the wheels to prevent motion during the operation of the apparatus, means for providing for motion of the turn-table at right angles to the length of the vessel, a depending extensible member composed of relatively sliding sections, one of said sections being secured to the turn-table, means for moving the sections relatively to each other and controlling their relative positions, a transverse, extensible arm composed of relatively sliding sections, one of said sections being mounted at the lower end of said extensible member, a cargo handling tool at the end of said arm, and power-actuated means for controlling the relative positions of said arm, advancing and retracting said tool to move the cargo to the center of the hold.

18. In a cargo trimming apparatus, a depending, extensible member composed of relatively sliding sections, means for moving the sections relatively to each other, and controlling their relative positions, a transverse, extensible arm composed of relatively sliding sections, one of said sections being mounted at the lower end of said depending extensible member, a cargo-handling tool at the end of said arm, and power-actuated means for controlling the relative positions of the sections of said arm, advancing and retracting said tool to move the cargo to the center of the hold, and means for rocking said extensible arm vertically to permit the tool to follow the contour of the hold.

19. In a cargo-trimming apparatus, a depending, extensible member composed of relatively sliding sections, means carried by said sections for moving the sections relatively to each other and controlling their relative positions, a transverse, extensible arm composed of a base and a plurality of sliding sections, said base being mounted at the lower end of said extensible member, a cargo-handling tool on said arm, and power-actuated means carried by the depending member for controlling the relative positions of the sections of said arm, advancing and retracting said tool to move the cargo to the center of the hold.

20. In a cargo-trimming apparatus, a turn-table, a depending, extensible member composed of relatively sliding sections, one of said sections being secured to the turn-table, means for moving the sections relatively to each other and controlling their relative positions, a transverse extensible arm composed of relatively sliding sections, one of said sections being mounted at the lower end of said depending extensible member, a cargo-handling tool at the end of said arm, and power-actuated means for controlling the relative positions of the sections of said arm, to move the cargo to the center of the hold, and means for rocking said extensible arm vertically to permit the tool to follow the contour of the hold.

21. In a cargo-trimming apparatus, a turn-table, means for supporting the same over a hatchway, a depending, extensible member composed of relatively sliding sections, one of said sections being secured to the turn-table, means carried by said member for moving the sections relatively to each other and controlling their relative positions, a transverse, extensible arm composed of relatively sliding sections being mounted at the lower end of said depending extensible member, a cargo handling tool at the end of said arm, and power-actuated means for controlling the relative positions of the sections of said arm, advancing and retracting said tool to move the cargo to the center of the hold, and means for rocking said extensible arm vertically to permit the tool to follow the contour of the hold, and power-actuated means for positively rotating the turn-table.

22. In a cargo trimmer, a support adapted to be placed over the hatchway of a vessel, an extensible depending member secured to said support, means for controlling the position of the lower end of said extensible member, an extensible arm composed of a plurality of sections and a base, said sections being mounted to slide relatively to each other and to the base, the base being secured to the said member at the lower end of said member, a cargo handling tool at the end of said arm, and means for controlling said arm, advancing and retracting the tool.

23. In a cargo trimmer, a turn-table adapted to be placed over the hatchway of a vessel, and extensible depending member secured to said turn-table, and means for controlling the position of the lower end of said extensible member, an extensible transverse arm at the lower end of said member, a cargo handling tool at the end of said arm, means for controlling said arm, advancing and retracting the tool, and means for rocking said arm.

24. In a cargo trimmer, a turn-table adapted to be placed over the hatchway of a vessel, an extensible, depending member secured to said turn-table, and means for controlling the position of the lower end of said extensible member, an extensible transverse arm at the lower end of said member, a cargo handling tool at the end of said arm, means for controlling said arm, advancing and retracting the tool, means for rocking said arm, and means for rotating said turn-table.

25. In a cargo trimmer, a support adapted to be placed over the hatchway of a vessel, a depending member secured to said support, means for controlling the position of the lower end of said member, an extensible transverse arm at the lower end of said member, and means for rocking said arm, said arm consisting of a plurality of relatively sliding sections, a cargo-handling tool secured to the end section, means for controlling said arm, advancing and retracting the tool consisting of a flexible tension member, means for simultaneously taking up one end and letting off the other end of said member, said tension member being secured intermediately to the tool carrying section, near the inner end thereof, pulleys near each end of some of the other sections, one of the sections being secured to the lower end of the depending extensible member, said tension member being passed about opposite sides of said respective pulleys on each section.

26. In a cargo trimmer, a support adapted to be placed over the hatchway of a vessel, a depending member secured to said support, means for controlling the position of the lower end of said member, an extensible, transverse arm at the lower end of said member, said arm consisting of a plurality of relatively sliding sections, a cargo handling tool secured to the end section, means for controlling said arm, advancing and retracting the tool, consisting of a flexible tension member, means for simultaneously taking up one end and letting off the other end of said member, said tension member being secured intermediately to the tool carrying section at a point spaced from the tool, pulleys near each end of another section, said tension member being passed about opposite sides of said respective pulleys, one of said sections being pivotally mounted in the lower end of the depending extensible member, and means for rocking said arm substantially in a vertical plane.

27. In a cargo trimmer, a support adapted to be placed over the hatchway of a vessel, a depending member secured to said support, means for controlling the position of the lower end of said member, and extensible transverse arm at the lower end of said member, said arm consisting of a plurality of relatively sliding sections, a cargo handling tool secured to the end section, means for controlling said arm, advancing and retracting the tool consisting of a flexible tension member, means for simultaneously taking up one end and letting off the other end of said member, said tension member being secured intermediately to the tool carrying section at a point spaced from the tool pulleys near each end of another section, said tension member being passed about opposite sides of said respective pulleys, one of said sections being pivotally mounted in the lower end of the depending extensible member.

28. In a cargo trimmer, a depending member, means for supporting the same on the deck of a vessel in a position in which it extends downward through the hatchway toward the bottom of the hold, a transverse extensible arm supported on the lower portion of said depending member, a plurality of relatively sliding sections composing said arm, a cargo-handling tool secured to one of said sections, means for starting and extending said arm to produce cargo moving strokes consisting of a flexible tension member secured at an intermediate point to the tool carrying section, means for simultaneously taking up the portion of said tension member on one side of said intermediate point and letting off the portion of said tension member on the opposite side of said point, pulleys on the moving sections near the opposite ends thereof, the portion of said tension member on one side of said intermediate point being led over the pulleys on each sliding section engaging opposite sides of said pulleys and being led from the pulley on the supported end of one sliding section and backward over the pulley on the end of the next section which supports said sliding section.

29. In a cargo trimmer, a depending member, means for supporting the same on the deck of a vessel in a position in which it extends downward through the hatchway toward the bottom of the hold, a transverse extensible arm supported on the lower portion of said depending member, a plurality of relatively sliding sections composing said arm, a cargo-handling tool secured to one of said sections, means for starting and extending said arm to produce cargo moving strokes consisting of a cable secured at an intermediate point to the tool carrying section, means for simultaneously taking up the portion of said cable on one side of said intermediate point and letting off the portion of said cable on the opposite side of said point, pulleys on the moving sections near the opposite ends thereof, the portion of said cable on one side of said intermediate point being led over the pulleys on each sliding section engaging opposite sides of said pulleys and being led from the pulley on the supported end of one sliding section and backward over the pulley on the end of the next section, which supports said sliding section.

30. In a cargo trimmer, for use in vessels, a turn-table, a normally depending member carried by said turn-table over the hatchway, and means carried by said turntable for extending said depending member into the hatchway and retracting it, a motor on the turn-table and positive connections from said motor for rotating the depending member, a transverse member supported at the lower end of said depending member, a cargo-handling means carried by said transverse member, and a motor mounted at the lower end of the depending member for actuating said cargo-handling means to engage and move the material constituting the cargo toward the depending member.

31. In a cargo trimmer for use in vessels, a turn-table, a support therefor, means carrying the support longitudinally and transversely of the vessel, a normally depending member carried by the turn-table over the hatchway, means for lowering an end of said member into the hold and for raising it, and power-actuated means carried on the support for rotating said member, a transverse arm at the lower end of the depending member, said transverse arm being composed of a base and a plurality of relatively sliding sections, a cargo-handling tool secured to one of said sections, and means carried by the depending member sliding said sections relatively to each other extending and retracting said arm, reciprocating said tool.

32. In a cargo trimmer for use in vessels, a normally depending member, means for supporting said member in a hatchway, means for lowering the end of said member into the bottom of the hold and for raising it and means for rotating said member, a transverse arm at the lower end of the depending member, said transverse arm being composed of relatively sliding sections, a cargo-handling tool carried by the arm, and a cable drive for sliding said sections relatively to each other extending and retracting said arm, and reciprocating said tool, and means for swinging said arm in a vertical plane.

33. In a cargo trimmer, a depending extensible member with means for controlling the length of the same, means for supporting the depending extensible member over the hatchway of a vessel whereby it may be extended down into the hold, a transverse arm mounted at the lower end of the depending extensible member, the transverse arm comprising a plurality of sections, a cargo handling tool at the outer end of said arm, the sections including a base section mounted on the depending member and the other sections being mounted to slide relatively to the base section and to slide relatively to each other, each said section, except the outer section, being provided at its outer end with a pulley, a tension member passed over each said pulley and connected to the inner end of the first sliding section, the tension member which is passed over the pulley on the base section, being wound upon a drum, said drum and a motor to actuate said drum to advance the first sliding section, a tension member passed about the pulley on the first sliding section, having one end attached to the base member and the other end attached to the second sliding section, and a pulley on each of the intermediate sections carrying a tension member similarly arranged, a tension member connected to the outer sliding section and a drum on the base section actuated by said motor to take up the tension member and withdraw all the sections.

34. The combination in a cargo trimmer of a depending extensible member, with means for controlling the length of the same and means for supporting the depending extensible member over the hatchway, permitting it to be extended downwardly into the hold, a cargo-handling tool and means for operating the same from the lower end of the extensible member, the support comprising a truck spanning the hatchway from side to side of the vessel and mounted to move longitudinally of the vessel, and a second truck mounted on the first-mentioned truck to move transversely of the vessel for said second truck, each truck having an opening through which the depending member extends.

35. The combination in a cargo trimmer of a depending extensible member, with means for controlling the length of the same and means for supporting the depending extensible member over the hatchway, permitting it to be extended downwardly into the hold, a cargo-handling tool and means for operating the same from the lower end of the extensible member, the support comprising a truck having a central opening, the truck spanning the hatchway from side to side of the vessel and tracks extending longitudinally of the vessel at each side of the hatchway on which the truck runs, a second truck mounted on the first-mentioned truck to move transversely of the vessel with tracks on the first truck, and power-operated means for moving both trucks.

36. In a cargo trimmer, a depending member with means for supporting the same over the hold of a vessel, whereby it may be extended downward into the hold, a transverse arm opposite the lower end of the depending extensible member, the transverse arm comprising a plurality of sections, one being mounted on the depending member and the other sections being mounted to slide relatively to each other, the first-mentioned section being known as the base section, and a cargo-handling tool carried by the outer end section, a cable connected to the outer end section and a drum on the base section about which said cable is wound, and means for rotating the drum to withdraw the end section and the other sliding sections therewith and contract the arm, a pulley on the outer end of the base section and a cable passed about said pulley, a drum on which one end of said cable is wound, the other end of the cable being fastened to the inner end of the first sliding section, each of the sliding sections having a pulley at its outer end and a cable passed about each said pulley, one end of each said cable being connected to the inner end of the next outer sliding section and the other end of said cable being connected to the next section toward the support whereby as the first sliding section is advanced, each of the other sliding sections is correspondingly advanced relatively to the section by which it is supported.

37. In a cargo trimmer, a depending member with means for supporting the same over the hold of a vessel, permitting the depending member to extend downward into the hold, a transverse arm connected to the lower end of the depending member, the transverse arm being composed of a base section secured to the lower end of the depending member, and sections sliding relatively to the base section and to each other, a cargo-handling tool mounted on the outer section and a cable connected to the outer section, means for taking up the same from the vicinity of the base section to withdraw the outer section and the other sliding sections, means for advancing the first sliding section, a pulley on the outer end of each intermediate section, and a cable passed over each said pulley and connected at one end to the section next to the rear and at the other end to the rear end of the section next in front whereby each section is advanced relatively to the next section to the rear as the first sliding section is advanced relatively to the base section.

Signed by me at Baltimore, Maryland, this 24th day of August, 1925.

GAINES O. B. EVERY.